US010821709B2

(12) United States Patent
Dimitrakopoulos et al.

(10) Patent No.: US 10,821,709 B2
(45) Date of Patent: Nov. 3, 2020

(54) MULTILAYER GRAPHENE STRUCTURES WITH ENHANCED MECHANICAL PROPERTIES RESULTING FROM DETERMINISTIC CONTROL OF INTERLAYER TWIST ANGLES AND CHEMICAL FUNCTIONALIZATION

(71) Applicants: University of Massachusetts, Boston, MA (US); Universidade Federal do Rio Grande do Sul-UFRGS, Porto Alegre (BR); The Government of the United States of America, as represented by the Secretary of the Navy, Washington, DC (US)

(72) Inventors: Christos Dimitrakopoulos, Suffield, CT (US); Dimitrios Maroudas, Amherst, MA (US); Andre R. Muniz, Porto Alegre (BR); David Kurt Gaskill, Alexandria, VA (US)

(73) Assignees: University of Massachusetts, Boston, MA (US); Universidade Federal Do Rio Grande Do Sul-UFRGS, Porto Alegre (BR); The Government of the United States of America, As Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/790,524

(22) Filed: Feb. 13, 2020

(65) Prior Publication Data

US 2020/0189240 A1 Jun. 18, 2020

Related U.S. Application Data

(62) Division of application No. 14/714,506, filed on May 18, 2015, now Pat. No. 10,562,278.

(Continued)

(51) Int. Cl.
*B32B 9/00* (2006.01)
*B32B 18/00* (2006.01)
(Continued)

(52) U.S. Cl.
CPC ............ *B32B 18/00* (2013.01); *B32B 37/025* (2013.01); *B32B 38/10* (2013.01); *C01B 32/182* (2017.08);
(Continued)

(58) Field of Classification Search
CPC ......... H01B 1/04; Y10T 428/30; B82Y 30/00; B82Y 10/00
(Continued)

(56) References Cited

U.S. PATENT DOCUMENTS 10,562,278 B2 2/2020 Dimitrakopoulos et al.
2011/0269629 A1 11/2011 Giustino et al.
(Continued)

OTHER PUBLICATIONS

Final Office Action for U.S. Appl. No. 16/041,404, entitled: "Formation of Interlayer Covalent Bonds in Bilayer, Trilayer and Multilayer Graphene", dated Feb. 7, 2020.
(Continued)

*Primary Examiner* — Daniel H Miller
(74) *Attorney, Agent, or Firm* — Hamilton, Brook, Smith & Renyolds, P.C.

(57) ABSTRACT

An article of manufacture includes a first graphene layer, a second graphene layer over the first graphene layer, the second graphene layer oriented at a first interlayer twist angle with respect to the first graphene layer and bonded by interlayer covalent bonds to the first graphene layer, and a third graphene layer over the second graphene layer, the third graphene layer oriented at a second interlayer twist angle with respect to the second graphene layer and bonded by interlayer covalent bonds to the second graphene layer. A (Continued)

multi-layer graphene article includes at least three graphene layers, each graphene layer being oriented at an interlayer twist angle with respect to an adjacent graphene layer and bonded by interlayer covalent bonds to the adjacent graphene layer.

9 Claims, 9 Drawing Sheets
(3 of 9 Drawing Sheet(s) Filed in Color)

Related U.S. Application Data

(60) Provisional application No. 62/005,496, filed on May 30, 2014.

(51) Int. Cl.
| | | |
|---|---|---|
| *B32B 38/10* | (2006.01) | |
| *C01B 32/186* | (2017.01) | |
| *C01B 32/182* | (2017.01) | |
| *B32B 37/00* | (2006.01) | |
| *C01B 32/194* | (2017.01) | |
| *H01B 1/04* | (2006.01) | |
| *B82Y 30/00* | (2011.01) | |

(52) U.S. Cl.
CPC .......... *C01B 32/186* (2017.08); *C01B 32/194* (2017.08); *B32B 2264/108* (2013.01); *B82Y 30/00* (2013.01); *H01B 1/04* (2013.01); *Y10T 428/30* (2015.01)

(58) Field of Classification Search
USPC .......................................... 428/408; 423/448
See application file for complete search history.

(56) References Cited

U.S. PATENT DOCUMENTS

| | | |
|---|---|---|
| 2011/0300058 A1 | 12/2011 | Strupinski |
| 2012/0212242 A1 | 8/2012 | Masel et al. |
| 2013/0181678 A1 | 7/2013 | Kourtakis et al. |
| 2014/0291282 A1 | 10/2014 | Bedell et al. |
| 2019/0055129 A1 | 2/2019 | Dimitrakopoulos et al. |

OTHER PUBLICATIONS

Andres, Physical Reviews B, 77, 045403 (2008).
Kim, J. et al., "Layer-Resolved Graphene Transfer via Engineered Strain Layers", Science 342, pp. 833-836 (2013).
Dimitrakopoulos, C. et al. "Optimization of Wafter-scale Epitaxial Graphene on SiC for RF Applications", GraphITA Workshop 2011, Extended Abstract, Gran Sasso National Laboratories, Assergi-L'Aquila, Italy, 4 pages.
Krishnan, et al. "Revisiting he domain model for lithium intercalated graphite", Appl. Phys. Lett. 103, 5 pages, 013113 (2013).
Emtsev, K. V. et al. "Towards wafer-size graphene layers by atmospheric pressure graphitization of silicon carbide", Nature Materials, vol. 8, pp. 203-207 (2009).
Avouris, P. et al. "Graphene: synthesis and applications", Materialstoday, vol. 15, No. 3, pp. 86-97 (2012).
Dimitrakopoulos, C. et al. "Effect of SiC wafer miscut angle on the morphology and Hall mobility of epitaxially grown graphene", Applied Physics Letters, 98, 4 pages, 222105 (2011).
Muniz, A. R. et al. "Formation of fullerene superlattices by inerlayer bonding in twisted bilayer graphene", Journal of Applied Physics, 111, 7 pages, 043513 (2012).
Muniz, A. R. et al. "Opening and tuning of band gap by the formation of diamond superlattices in twisted bilayer graphene", Phys. Rev. B. 86, 075404 (2012).
Muniz, A. R. et al. "Superlattices of Fluorinated Interlayer-Bonded Domains in Twisted Bilayer Graphene", The Journal of Physical Chemsitry, 117, pp. 7315-7325 (2013).
Elias, D. C. et al. "Control of Graphene's Properties by Reversible Hydrogenation: Evidence for Graphane", Novoselov Science 323, 610 (2009).
Yu et al., "Graphene-on-Diamond Devices with Increased Current-Carrying Capcity: Carbon sp2-on-sp3 Technology," Nano Lett. 12: 1603-1608 (2012).
Bae et al., "Roll-to-roll production of 30-inch graphene films for transparent electrodes", Nat Nano, 5(8): p. 574-578 (2010).
Berman et al., "Metal-induced rapid transformation of diamond into single and multilayer graphene on wafer scale", Nature Communications 7:12099, 8 pages (2016).
Son et al., "Hydrogenated monolayer graphene with reversible and tunable wide band gap and its field-effect transistor", Nature Communications (2016).
Chernozatonskii et al. "Diamond-like C 2 H nanolayer, diamane: Simulation of the structure and properties", Jetp Letters 90.2: 134-138 (2009).
Jones et al. "Oxidative pit formation in pristine, hydrogenated and dehydrogenated graphene." Applied Surface Science 264: 853-863 (2013).
Pumera et al., "Graphane and hydrogenated graphene", Chemical Society Reviews, 42: 5987-5995 (2013).
Non-Final Office Action for U.S. Appl. No. 16/041,404, entitled: "Formation of Interlayer Covalent Bonds in Bilayer, Trilayer and Multilayer Graphene", dated Aug. 15, 2019.
Non-Final Office Action for U.S. Appl. No. 16/041,404, entitled "Formation of Interlayer Covalent Bonds in Bilayer, Trilayer and Multilayer Graphene," dated Jul. 28, 2020.

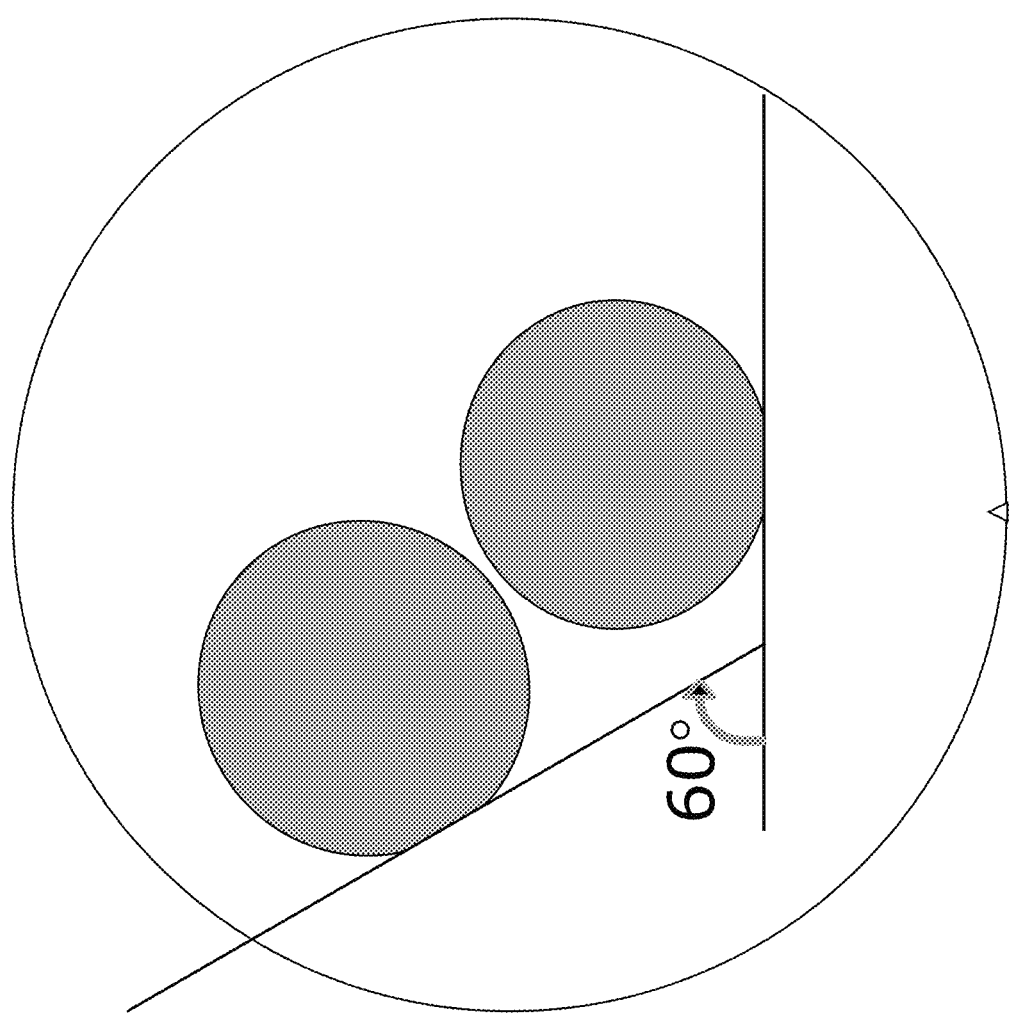

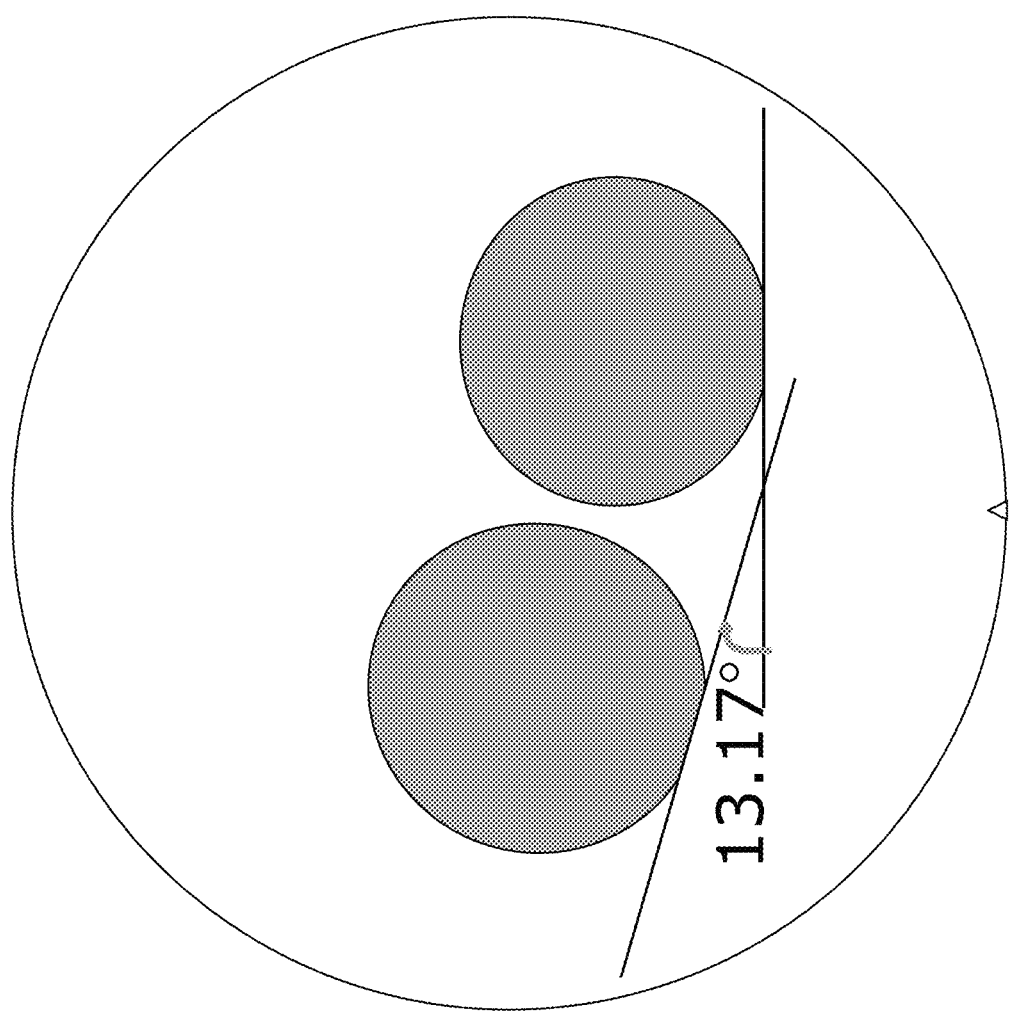

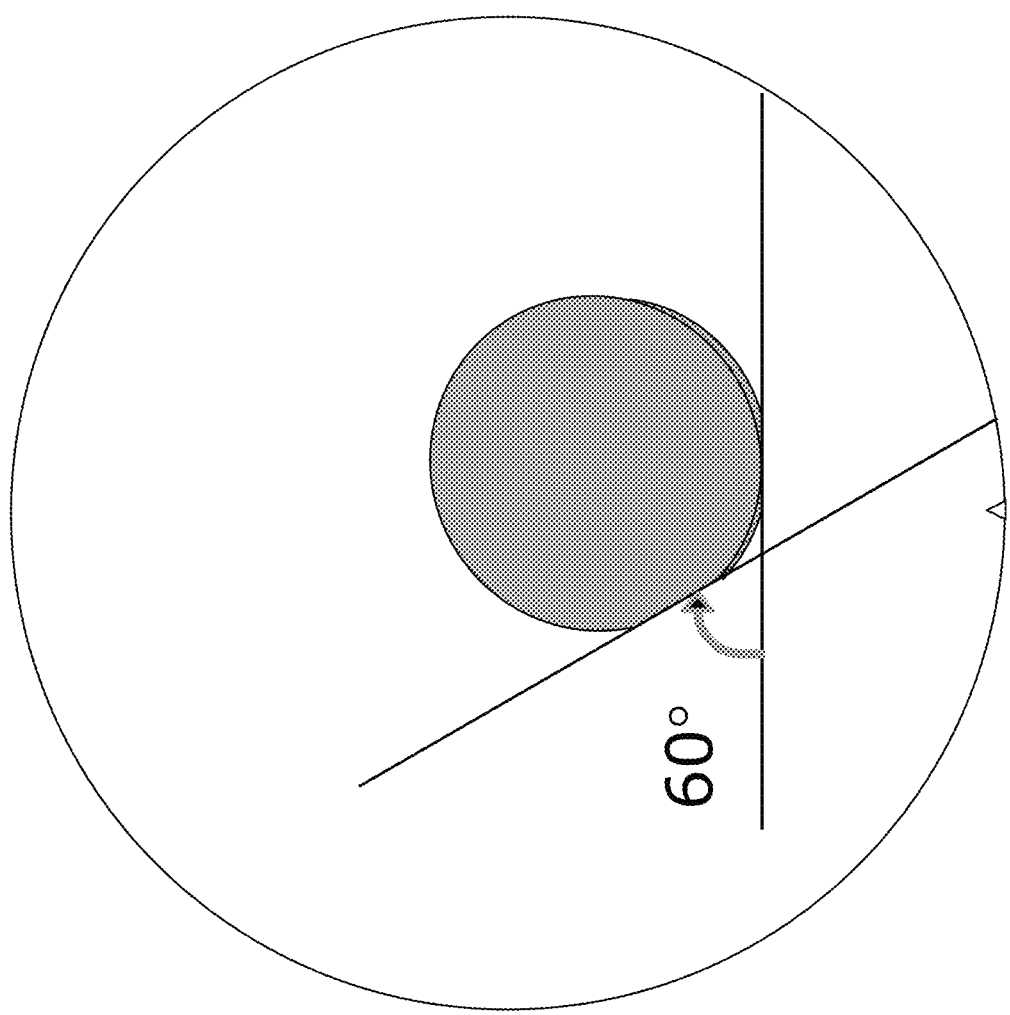

MULTILAYER GRAPHENE STRUCTURES WITH ENHANCED MECHANICAL PROPERTIES RESULTING FROM DETERMINISTIC CONTROL OF INTERLAYER TWIST ANGLES AND CHEMICAL FUNCTIONALIZATION

RELATED APPLICATION(S)

This application is a divisional of U.S. application Ser. No. 14/714,506, filed on May 18, 2015, which claims the benefit of U.S. Provisional Application No. 62/005,496, filed on May 30, 2014. The entire teachings of the above application(s) are incorporated herein by reference.

BACKGROUND OF THE INVENTION

Graphene, is an atomically thin two-dimensional (2D) sheet of covalently bonded carbon atoms arranged in a hexagonal, honeycomb-like pattern. Graphene exhibits spectacular mechanical properties, as, for example, a Young modulus that approaches 1 TPa and tensile strength that is an order of magnitude higher than that of the best steel, for the same sample thickness. The thickness of a graphene monolayer is 0.34 nm, thus for macroscopic application thousands of graphene layers would have to be stacked together, because, while the strength of single-layer graphene is outstanding, single-layer graphene is too thin for practical applications. Unfortunately, the weak van der Waals interlayer forces acting between consecutive graphene layers within the stack are responsible for the low shear strength of the stack.

Therefore, there is a need for controllably reinforcing the interlayer bonding in the multi-layer stack by incorporating covalent bonds between adjacent graphene layers with control over the number and spatial distribution of the interlayer bonds.

SUMMARY OF THE INVENTION

Multi-layer structures of modified graphene for applications exploiting the impressive mechanical strength of the atomically thin two-dimensional (2D) graphene are presented herein, and methods of forming these structures. More particularly, multi-layer graphene structures with enhanced mechanical properties resulting from control of interlayer twist angles and specialized treatments that create covalent bonds between subsequent graphene layers are described herein.

In one embodiment, an article of manufacture includes a first graphene layer, a second graphene layer over the first graphene layer, the second graphene layer oriented at a first interlayer twist angle with respect to the first graphene layer and bonded by interlayer covalent bonds to the first graphene layer, and a third graphene layer over the second graphene layer, the third graphene layer oriented at a second interlayer twist angle with respect to the second graphene layer and bonded by interlayer covalent bonds to the second graphene layer. The first and second interlayer twist angles can each separately be in a range of between 0° and about 16°, or between about 44° and 60°, such that in some embodiments, the first and second interlayer twist angles can be equal, and in other embodiments, the first and second interlayer twist angles can be unequal to each other. In some embodiments, the first and second interlayer twist angles can be 0° or 60°, resulting in the formation of a two-dimensional (2D) diamond structure (nanodiamond). In certain embodiments, at least one of the first graphene layer, the second graphene layer, and the third graphene layer is a polycrystalline graphene layer.

In another embodiment, a method of making an article includes growing a first graphene layer on a silicon carbide wafer, exfoliating the first graphene layer onto a first transfer layer, disposing the first graphene layer and first transfer layer onto a host substrate, so that the first graphene layer is in contact with the host substrate surface, and removing the first transfer layer. The method then includes growing a second graphene layer on a silicon carbide wafer, exfoliating the second graphene layer onto a second transfer layer, disposing the second graphene layer and second transfer layer over the first graphene layer at a first interlayer twist angle with respect to the first graphene layer, so that the second graphene layer is in contact with the first graphene layer, and removing the second transfer layer. The method further includes covalently bonding the first and second graphene layers, the bonding involving a fraction of carbon atoms of each of the first and second graphene layers. Subsequent graphene layers can then be added by repeating the growing, exfoliating, disposing, removing, and bonding steps. The first graphene layer, the second graphene layer, and the third graphene layer, and the first and second interlayer twist angles are as described above. Interlayer covalent bonding is accomplished by a chemical functionalization intermediate step, such as hydrogenation (e.g., in a hydrogen plasma), fluorination (e.g., in a fluorine plasma), or other methods known in the art.

In yet another embodiment, a multi-layer graphene article includes at least three graphene layers, each graphene layer being oriented at an interlayer twist angle with respect to an adjacent graphene layer and bonded by interlayer covalent bonds to the adjacent graphene layer. The interlayer twist angle can be in a range of between 0° and about 16°, or between about 44° and 60°.

This invention has many advantages, including control of mechanical properties by control of the interlayer twist angle and of the interlayer bonding in multi-layer graphene structures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 1C-1 and 1C-2: relative orientation of two graphene layers grown on the same SiC wafer sequentially. FIG. 1C-1: rotation angle of the graphene flats is 60°. FIG. 1C-2: rotation angle of the graphene flats is 13.17°. The straight lines mark the flat of each graphene layer, and thus define indirectly the 2D lattice orientation.

FIGS. 1D-1 and 1D-2: the pairs of graphene layers illustrated in FIGS. 1C-1 and 1C-2 after they have been placed on top of each other to make twisted epitaxial graphene bilayers with twist angle of: FIG. 1D-1 60°; FIG. 1D-2 13.17°.

FIGS. 2a-f: atomic structures of representative interlayer-bonded configurations. Each frame shows different views of the graphene bilayer and of the embedded nanodomains generated by interlayer C—C covalent bonding. Fully interlayer-bonded (a) AA-stacked and (b) AB-stacked bilayer. Hexagonal superlattices of (c) hexagonal diamond-like domains embedded in a $\varphi=13.17°$ twisted bilayer, and (d) cubic diamond-like domains embedded in a $\varphi=9.43°$ twisted bilayer. (e) Honeycomb superlattice of cubic diamond-like domains embedded in a 9.43° twisted bilayer. (f) Superlattice of mixed cubic and hexagonal diamond-like domains in a 9.43° twisted bilayer. Silver/blue and yellow spheres denote those of the C atoms that are involved in covalent interlayer C—C bonds and the remaining C atoms in upper/lower twisted bilayer graphene layers, respectively. Dotted lines mark the edges of the superlattice unit cells. (See Machado et al., Appl. Phys. Lett. 103, 013113 (2013)).

DETAILED DESCRIPTION OF THE INVENTION

Figure 1A:
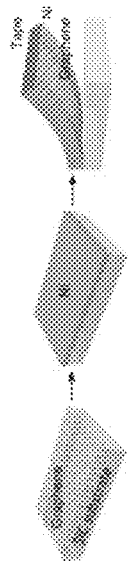
FIG. 1A: Schematic of the method for transferring graphene directly from the SiC wafer surface onto a $SiO_2$/Si wafer. A strained layer (Ni) is deposited on graphene grown on a SiC wafer. The graphene/Ni layer is exfoliated by using a handling layer (e.g., thermal release tape) for transfer. (See J. Kim, H. Park, J. B. Hannon, S. W. Bedell, K. Fogel, D. K. Sadana, and C. Dimitrakopoulos, Science 342, 833-836 (2013)).

A description of example embodiments of the invention follows.

Guided by computational results, described below is a method of producing multi-layers of graphene (an atomically thin layer of carbon) with accurately controllable twist angles between subsequent graphene layers, and which after hydrogenation (or analogous functionalization) induce covalent bonding between consecutive graphene layers within the stack. This interlayer bonding results in dramatically higher shear strength for the multi-layer structure. Coupled with the tremendous tensile strength of graphene (10 times the strength of steel, for equivalent thicknesses), ultrathin but ultrastrong composite materials based on twisted and covalently bonded graphene multi-layers can be produced. Applications of such large area graphene multi-layers could include bulletproof vests with a thickness ranging from as low as a few microns to a few millimeters.

Researchers have been attempting to stack polycrystalline multi-layers of graphene and determine their mechanical properties for ballistic protection applications. Such layers are grown on relatively large area metal foils such as Cu or Ni and then transferred to another substrate by etching the metal foil. The problem with this conventional approach is that the various orientations of graphene within the polycrystalline layers do not allow any control of the twist angle, that is, the angle between two differently oriented graphene domains within two subsequent layers, stacked on top of each other. Theoretical findings clearly state that absolute control over the interlayer twist angle is needed in order to controllably create the desired covalent bonding density and distribution between layers with high pattern regularity, and to form a structure that uniformly and significantly increases the shear strength of the bilayer, and eventually the multi-layer as a whole. (See Machado et al., Appl. Phys. Lett. 103, 013113 (2013) (hereinafter "Machado")).

This prediction, coupled with a recent paper that demonstrated how one can make single crystalline (i.e., with unique azimuthal orientation) graphene layers economically and transfer them to other substrates (See "Layer-Resolved Graphene Transfer via Engineered Strain Layers" J. Kim, H. Park, J. B. Hannon, S. W. Bedell, K. Fogel, D. K. Sadana, and C. Dimitrakopoulos, Science 342, 833-836 (2013) (hereinafter "Dimitrakopoulos")) enables making bilayers and multi-layers with controlled twist angles, which, in conjunction with a method for hydrogenation of the graphene (hydrogen plasma exposure, irradiation in appropriate atmosphere, etc.), or analogous chemical functionalization enables the incorporation of covalent bonds with controlled density and spatial arrangement between consecutive graphene layers within the stack. This technology will potentially produce in the future ultrastrong thin materials for ballistic protection applications. Successful and cost-effective fabrication of large-area reinforced multi-layer graphene sheets (LAReMuGS) will address needs for ultrastrong, ultralight, electrically conductive sheets in other industries, e.g., the aeronautics industry, which has just produced passenger airplanes with composite panels (e.g., Boeing 787). LAReMuGS could play a pivotal role in the development of panels and structural components for planes, with a substantial market impact.

It is notable that a range of twist angles are suitable for controlled covalent bond densities and spatial distributions, which affect the mechanical properties of the multi-layer stack, and, thus, the stacks could be customized for various purposes. Recent efforts to stack large-area polycrystalline graphene layers, grown by chemical vapor deposition (CVD) on Cu foils, have failed to demonstrate a shear strength of multi-layer graphene suitable for practical applications for multi-layer graphene. The primary reason for this shortcoming is the weak van der Waals adhesion between layers that results in low shear strength. The interlayer bonding described herein overcomes this shortcoming and enables the envisioned products and applications.

Another problem with the conventional approach of stacking multiple layers of polycrystalline graphene is that the various orientations of graphene within the polycrystalline layers do not allow any precise control of the twist angle (angle between differently oriented overlapping graphene domains within two adjacent layers). Theoretical findings have established relations between the twist angle and the creation of uniformly distributed and regularly patterned covalent bonding between layers after appropriate processing. (See Machado).

Despite the issue of having a non-uniform distribution and an irregular pattern of covalent bonds when stacking multiple layers of polycrystalline graphene, the effect of the creation of interlayer covalent bonding on the shear modulus of the bilayer or multilayer graphene structure would be highly positive. Specifically, by including at least one polycrystalline graphene layer in a stack of two graphene layers, different regions of the bilayer will have different twist angles. In other words, the twist angle of this kind of graphene bilayer will be non-uniform, changing depending on the orientation of the crystallites (single crystal domains) within at least one of the graphene layers of the bilayer. This non-uniformity of the bilayer twist angle will translate to a non-uniform spatial distribution of the covalent bonds and to an irregular pattern of the covalent bonds. FIG. 2 demonstrates how the spatial distribution and pattern of the covalent bonds changes as the twist angle changes between a few discrete values.

This interlayer bonding significantly increases the shear strength of the multi-layer structure, by enhancing the resistance of layers to slip relative to their adjacent layers. (See Machado). This prediction, coupled with work by Dimitrakopoulos and co-workers at IBM enables making graphene bilayers and multi-layers with precisely controlled twist angles. (See Dimitrakopoulos). That work showed how single crystalline (i.e., with unique orientation) graphene layers can be grown and transferred economically to other substrates. The above advances, in conjunction with a method for chemical functionalization of the multi-layer graphene, completes a set of technologies that can produce thin, ultrastrong materials for ballistic protection applications, as well as composite materials (e.g., for airplane parts, etc.).

The main aspects of the embodiments described herein are:

(a) Precise control of twist angles for rotational stacking of graphene layers over large areas (limited by the size of the SiC wafer) using the growth and transfer method shown in FIG. 1A. (See Dimitrakopoulos). The twist angle control is achieved by growing epitaxially single crystalline graphene monolayers on SiC wafers and subsequently transferring them one by one on top of each other onto a substrate of choice with a specific twist angle (FIG. 1B); the twist angle is accurately controlled by rotating the straight edge of one graphene layer with respect to its adjacent layer by a specific angle (the straight edge is caused by the SiC wafer flat). Notably, other transferred large-area graphene (LAG) types cannot fulfill this requirement, as they are inherently polycrystalline.

Figure 3:
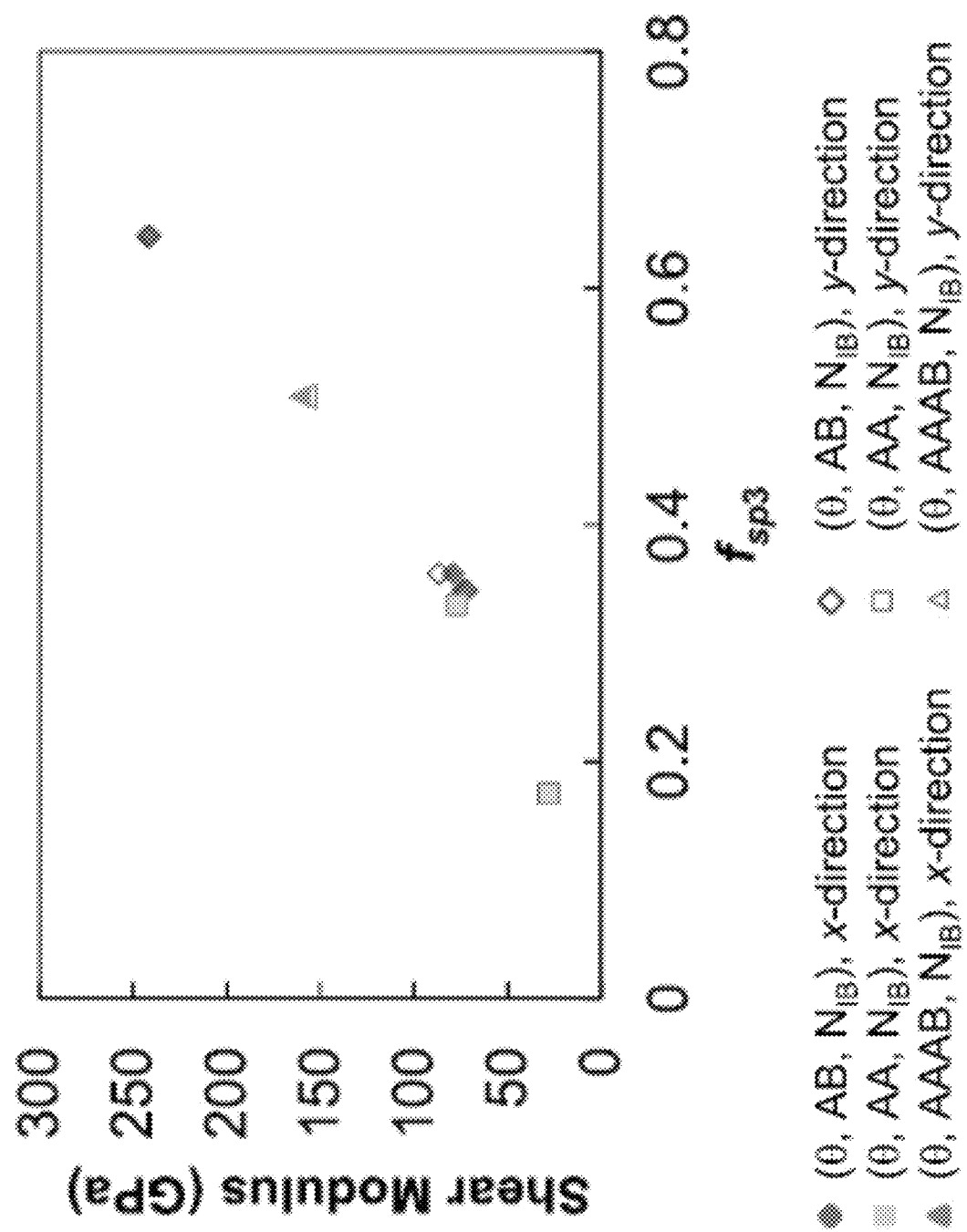
FIG. 3 is a graph of shear modulus (in GPa) as a function of the fraction ($f_{sp3}$) of covalent $sp^3$ C—C bonds in the previously $sp^2$-bonded C atoms in the two graphene layers.

(b) A multi-layer graphene structure with interlayer covalent bonding, and much superior shear strength. This structure is built up from bilayer graphene, shown in FIG. 2, and is predicted to have superior shear strength, as shown in FIG. 3, where the predicted shear strength of a bilayer graphene structure is shown as a function of the fraction of covalent $sp^3$ C—C bonds in the previously $sp^2$-bonded C atoms in the two graphene layers. The data points shown in FIG. 3 are also listed in Table 1.

TABLE 1

Configurations examined in the MD simulations of the mechanical behavior of superlattices of interlayer-bonded domains in twisted bilayer graphene (TBG) under uniaxial tensile deformation and interlayer shear loading.

| Configuration | $f_{sp3}$ |
|---|---|
| (0°, AB, max) | 1 |
| (0°, AA, max) | 1 |
| (9.43°, AB, 7) | 0.345 |
| (9.43°, ABAB, 14) | 0.644 |
| (9.43°, AA, 3) | 0.173 |
| (9.43°, AAAB, 10) | 0.509 |

TABLE 1-continued

Configurations examined in the MD simulations of the mechanical behavior of superlattices of interlayer-bonded domains in twisted bilayer graphene (TBG) under uniaxial tensile deformation and interlayer shear loading.

| Configuration | $f_{sp3}$ |
|---|---|
| (13.17°, AB, 3) | 0.359 |
| (13.17°, AA, 3) | 0.333 |

Note that a twist angle of 0° is predicted to result in the most complete overlap between the two graphene layers and the highest $f_{sp3}$ (twist angle=0° yields $f_{sp3}$=1.0, not shown in FIG. 3, which is predicted to have a shear modulus of 432 GPa). For $f_{sp3}$=1.0, the structure is the equivalent of 2D-diamond (hereinafter "nanodiamond"). For comparison to the shear modulus values predicted in FIG. 3, steel has a shear modulus of about 79.3 GPa. As shown in FIG. 1F, an article of manufacture 100 includes first graphene layer 120 grown on SiC substrate 110, second graphene layer 130 over first graphene layer 120, second graphene layer 120 being oriented at a first interlayer twist angle with respect to first graphene layer 120 and bonded by interlayer bonds 125 to first graphene layer 120, and third graphene layer 140 over second graphene layer 130, third graphene layer 140 being oriented at a second interlayer twist angle with respect to second graphene layer 130 and bonded by interlayer bonds 135 to second graphene layer 130. The first and second interlayer twist angles (not shown in FIG. 1F) can each separately be in a range of between 0° and about 16°, or between about 44° and 60°.

(c) A method for the fabrication of these 2D material structures.

Growth of 1-2 layer graphene on SiC: high-quality flat monolayer graphene can be grown epitaxially on the Si face of SiC (0001) wafers via a practically self-limiting decomposition of the SiC surface and sublimation of Si. (See Emtsev, K. V., Bostwick, A., Horn, K., Jobst, J., Kellogg, G. L., Ley, L., et al. (2009), "Towards wafer-size graphene layers by atmospheric pressure graphitization of silicon carbide," Nature Materials, 8, 203-207; "Graphene: synthesis and applications" P. Avouris and C. Dimitrakopoulos, Mater. Today 15, 86-97 (2012)).

A 4-inch epitaxial graphene sheet with a single orientation is grown on the Si-face (0001) of a 4H—SiC wafer with a miscut angle of 0.05° or lower. (See "Effect of SiC wafer miscut angle on the morphology and Hall mobility of epitaxially grown graphene" Dimitrakopoulos C., Grill A., McArdle T. J., Liu Z., Wisnieff R., Antoniadis D. A. Applied Physics Letters, 98, 222105 (2011)). The graphene formation is performed in a high-temperature chemical vapor deposition (CVD) reactor. The SiC substrate is annealed at a temperature in a range of between about 400° C. and about 1050° C., such as about 850° C., for a duration greater than about 1 minute, such as for 20 minutes, while evacuating the cell for surface cleaning in vacuum (i.e., at a pressure less than about $1\times10^{-3}$ mbar, such as about $1\times10^{-6}$ mbar). The cell is then filled with $H_2$ up to a pressure in a range of between about 10 and about 1000 mbar, such as about 800 mbar, and the substrate temperature is raised to a temperature in a range of between about 1350° C. and about 2000° C., such as about 1545° C., for about 30 min, for $H_2$ to etch the top layers of SiC that might contain structural defects from the wafer fabrication and polishing process, oxidation or other non-volatile contaminants. The graphitization is performed at a pressure in a range of between about $1\times10^{-3}$ mbar and about 1000 mbar, such as about 100 mbar, of Ar at a temperature in a range of between about 1450° C. and about 2000° C., such as about 1575° C., for a duration greater than about 1 minute, such as about 60 min.

The graphene is completely exfoliated using a Ni adhesive-stressor layer and a thermally releasable tape handling layer. (See Dimitrakopoulos). This method of selective graphene exfoliation with single-layer precision is based on the binding energy differences between graphene and different metals. The process is illustrated in FIG. 1A. After the exfoliation of an epitaxial graphene layer from SiC using Ni as the first adhesive-strained layer (first exfoliation), the exposed additional graphene stripes are separated from the monolayer graphene sheet on Ni using a second adhesive strained layer (stripe exfoliation) followed by transfer onto another wafer. For the selective graphene stripe exfoliation, a Au layer is used as an adhesive-strained layer. (See Dimitrakopoulos).

The same SiC wafer can be reused to generate many more similar graphene layers for the fabrication of the multi-layer twisted and covalently bonded graphene. In order to obtain comparable graphene quality from the second graphitization of the same SiC wafer after the transfer of the originally grown graphene, the surface of the wafer is thoroughly cleaned by dipping into $FeCl_3$ solution for complete removal of any Ni remnants and then using again the above described recipe. However, it is expected that the $H_2$ etching step duration could be reduced to 15 min or below, to minimize the use of SiC thickness consumed per graphene layer transferred.

Figure 1B:
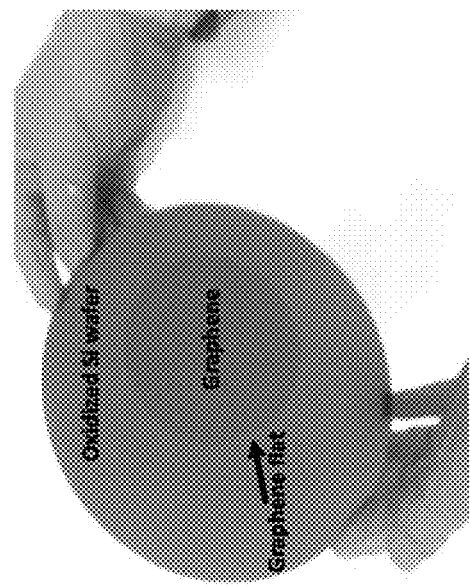
FIG. 1B: 4-inch-diameter single-crystal graphene transferred onto a Si/$SiO_2$ wafer. The graphene flat is visible. The next graphene layer will be deposited on top of the first graphene layer, with its graphene flat at a specific twist angle φ relative to this flat.
Figures 1, 1D, 2:
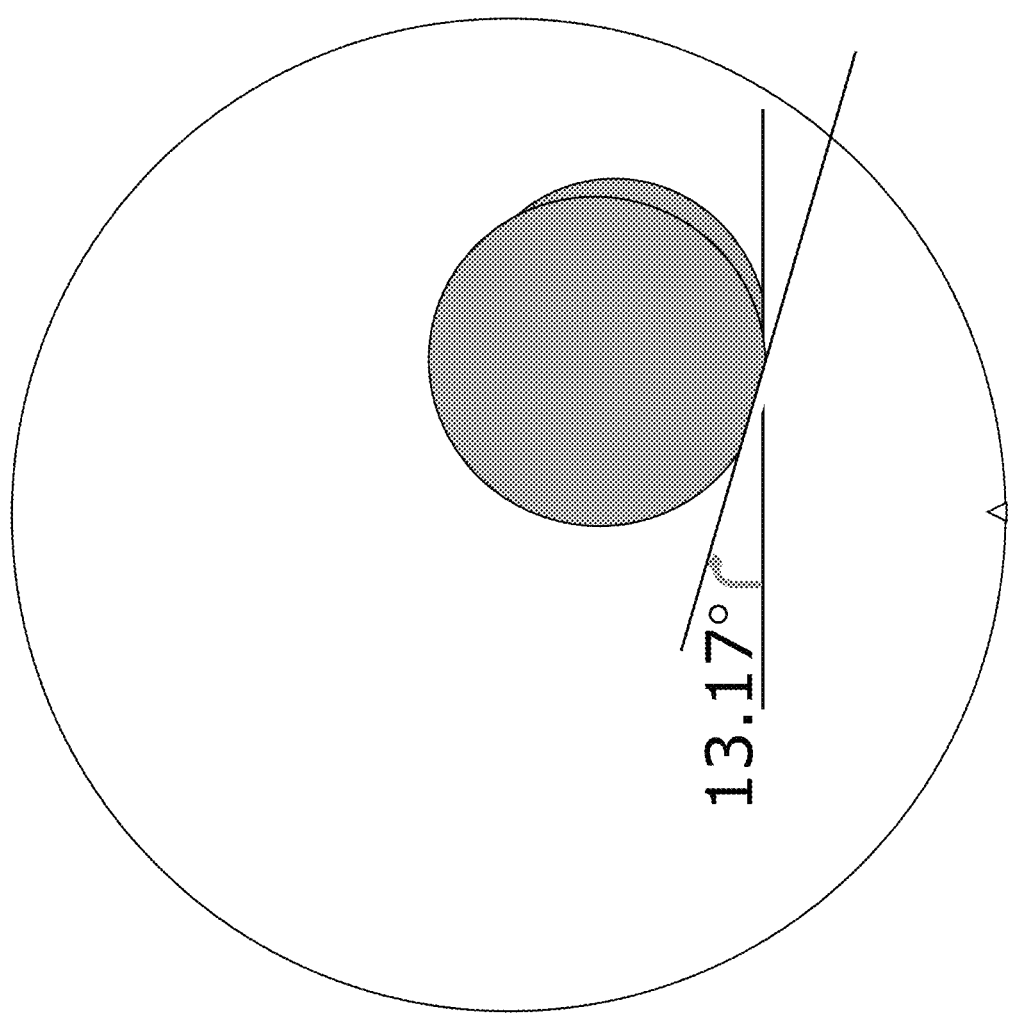
Figure 1E:
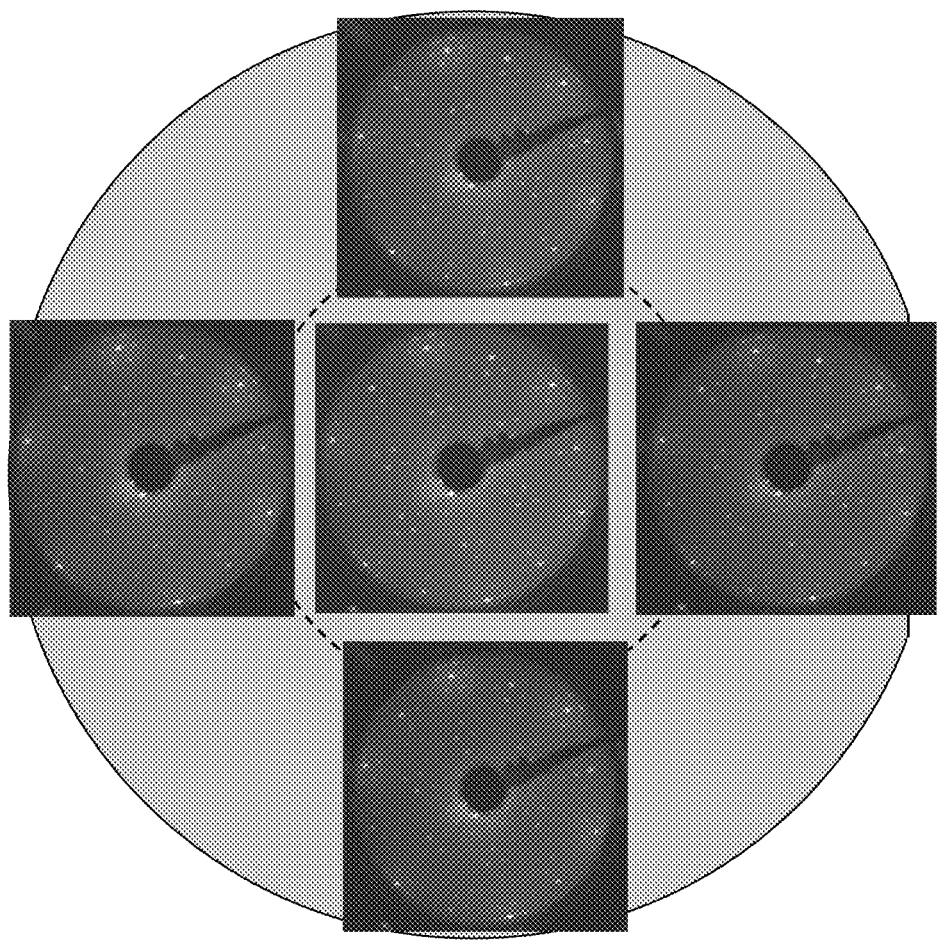
FIG. 1E: LEED images taken at approximately the wafer center and on an 1" diameter circle (dashed line) around the center. All images appear identical, showing a coherent graphene structure over the whole SiC wafer area. (See C. Dimitrakopoulos, A. Grill, T. J. McArdle, Y. M. Lin, Z. Liu, D. Pfeiffer, R. Wisnieff and Ph. Avouris GraphITA Workshop 2011, Extended Abstract, Gran Sasso National Laboratories, Assergi-L'Aquila, Italy).
Figure 1F:
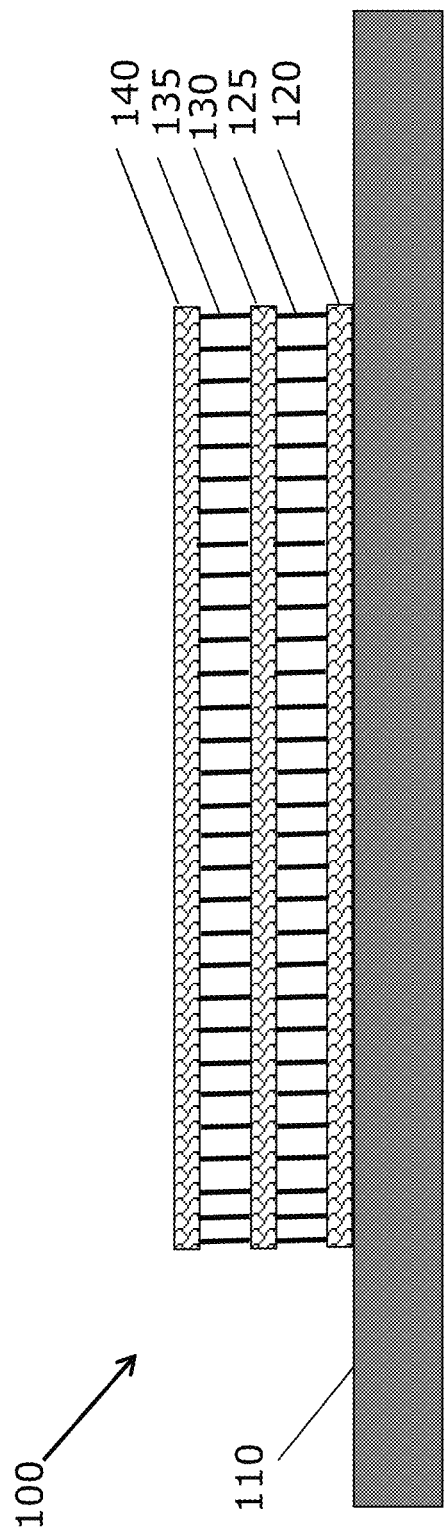
FIG. 1F is an illustration of a multi-layer graphene structure having three graphene layers.
Figure 2:
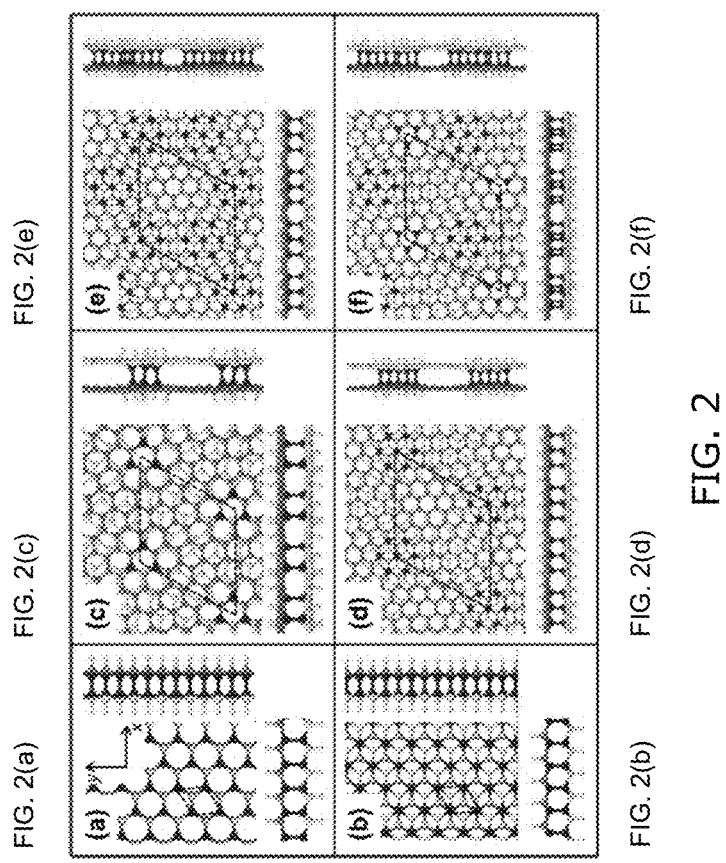

The twist angle control is achieved by growing epitaxially single crystalline graphene monolayers on SiC wafers and subsequently transferring them one by one on top of each other onto a substrate of choice with a specific twist angle, as shown in FIGS. 1B, 1C, and 1D. When two epitaxial graphene layers have been deposited one on top of the other with a specific twist angle, the bilayer is exposed to hydrogen or fluorine (or other reactive species that can form stable functionalized interlayer bonded structures), in order to break the pi structure of graphene locally and create interlayer bonding, accomplished by chemical functionalization, such as hydrogenation, fluorination, etc., which induces the formation of covalent $sp^3$ C—C bonds between the previously $sp^2$-bonded C atoms in the two adjacent graphene layers. (See A. R. Muniz and D. Maroudas, J. Appl. Phys. 111, 043513 (2012); A. R. Muniz and D. Maroudas, Phys. Rev. B. 86, 075404 (2012); A. R. Muniz and D. Maroudas, J. Phys. Chem. C 117, 7315 (2013)). A mild hydrogen or fluorine plasma can be used for this purpose. Atomic hydrogen is known to convert the conductive monolayer of graphene to insulating graphane. (See D. C. Elias, R. R. Nair, T. M. G. Mohiuddin, S. V. Morozov, P. Blake, M. P. Halsall, A. C. Ferrari, D. W. Boukhvalov, M. I. Katsnelson, A. K. Geim, K. S. Novoselov Science 323, 610 (2009)). While this reference describes complete conversion of the $sp^2$ monolayer of graphene to $sp^3$ monolayer graphane, a lower concentration of atomic hydrogen in the flowing gas would ensure selective conversion of the theoretically predicted regions of twisted bilayer graphene to a bilayer connected covalently at the above mentioned regions with covalent bonds. (See Machado). The dilution of reactive atomic hydrogen species can be achieved with controlling the flow of the carrier gas (either $H_2$ or an inert gas such as Argon). After the formation of the first bilayer with localized covalent bond arrangements, as predicted by Machado, a third graphene layer can be transferred and placed on top of the bilayer at a specific angle, using the transfer method described above and another round of hydrogenation, fluorination or other functionalization can follow to induce covalent bonding between the top two layers (layer 2 and 3). These process steps can be repeated many times until the desired covalently bonded graphene multi-layer thickness is reached.

Without wishing to be limited to any particular theory, it is believed that a Bernal AB-stacked graphene bilayer can be converted to a cubic diamond diatomic layer when the $sp^2$ structure of graphene is completely converted to $sp^3$, with the simultaneous introduction of covalent bonding between all the C atoms of the bilayer. Such a structure is called 2D diamond, and can be achieved by appropriately adjusting the bilayer twist angle to 60°, which is equivalent to 0° due to hexagonal symmetry (so that a rotation by, for example, 16° to the right is equivalent to a rotation by 44° to the left), and then applying the functionalization methods described above, such as hydrogenation, fluorination, or other functionalization. More layers sequentially added on top of the original 2D diamond bilayer, and then functionalized as above, will result in thicker 2D diamond structures (equivalent to very thin diamond films). The size and lateral coherence of such structures, limited only by the size of the grown epitaxial graphene on a SiC wafer, is unprecedented for single-crystal 2D diamond structures.

The shear strength reinforcement of graphene multi-layers by the introduction of nearest neighbor (n.n.) interlayer covalent bonding is extendable to the case where each, or at least one of the n.n. layers is a multidomain (polycrystalline) graphene layer with random azimuthal orientation of the domains. Because there are many different angles that produce interlayer bonding, such a n.n. bilayer is likely to contain n.n. interlayer domains with orientations that produce n.n. interlayer covalent bonding. Such bonding will reinforce the shear strength of the resulting bilayer or multi-layer, even though its density and topological distribution will vary from one n.n interlayer domain pair to another.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of making an article, comprising:
orienting a first graphene layer at a first interlayer twist angle with respect to a second graphene layer;
bonding the second graphene layer to the first graphene layer by interlayer covalent $sp^3$ bonds;
orienting a third graphene layer at a second interlayer twist angle with respect to the second graphene layer; and
bonding the third graphene layer to the second graphene layer by interlayer covalent $sp^3$ bonds.

2. The method of claim 1, wherein the method comprises:
a) growing the first graphene layer on a silicon carbide wafer;
b) exfoliating the first graphene layer onto a first transfer layer;
c) disposing the first graphene layer and first transfer layer onto a host substrate, so that the first graphene layer is in contact with the host substrate surface;
d) removing the first transfer layer;

e) growing the second graphene layer on a silicon carbide wafer;
f) exfoliating the second graphene layer onto a second transfer layer;
g) disposing the second graphene layer and second transfer layer over the first graphene layer at the first interlayer twist angle with respect to the first graphene layer, so that the second graphene layer is in contact with the first graphene layer;
h) removing the second transfer layer;
i) covalently bonding the first and second graphene layers, the bonding involving a fraction of carbon atoms of each of the first and second graphene layers;
j) growing the third graphene layer on a silicon carbide wafer;
k) exfoliating the third graphene layer onto a third transfer layer;
l) disposing the third graphene layer and third transfer layer over the second graphene layer at the second interlayer twist angle with respect to the second graphene layer, so that the third graphene layer is in contact with the second graphene layer;
m) removing the third transfer layer; and
n) covalently bonding the third and second graphene layers, the bonding involving a fraction of carbon atoms of each of the second, and third graphene layers.

3. The method of claim 1, wherein the first and second interlayer twist angles are each separately in a range of between 0° and about 16°.

4. The method of claim 1, wherein the first and second interlayer twist angles are each separately in a range of between about 44° and 60°.

5. The method of claim 1, wherein the covalent bonding includes chemical functionalization of the graphene layers.

6. The method of claim 5, wherein chemical functionalization includes hydrogenation.

7. The method of claim 6, wherein hydrogenation includes using a hydrogen plasma.

8. The method of claim 5, wherein chemical functionalization includes fluorination.

9. The method of claim 8, wherein fluorination includes using a fluorine plasma.

* * * * *